(No Model.)  2 Sheets—Sheet 1.

P. DIEHL.
APPARATUS FOR HARDENING AND TEMPERING BY ELECTRICITY.

No. 388,645. Patented Aug. 28, 1888.

WITNESSES:

INVENTOR,
Philip Diehl.
BY
Pope Edgecomb & Terry,
ATTORNEYS.

(No Model.) 2 Sheets—Sheet 2.
P. DIEHL.
APPARATUS FOR HARDENING AND TEMPERING BY ELECTRICITY.
No. 388,645. Patented Aug. 28, 1888.
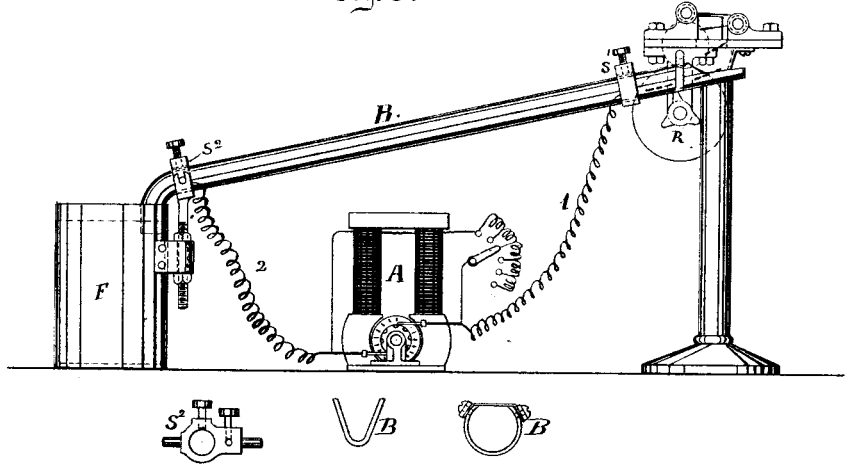
Fig. 3.
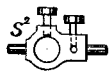  
Fig. 6.   Fig. 7.   Fig. 8.
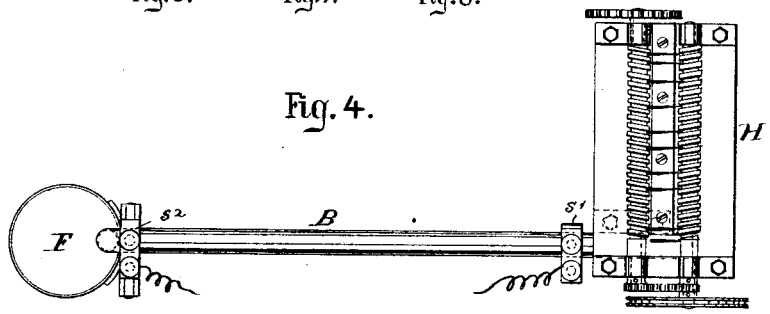
Fig. 4.
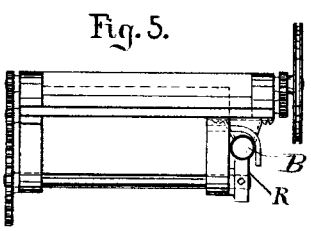
Fig. 5.
WITNESSES:
Albert W. Pentz
James G. Green
INVENTOR,
Philip Diehl,
BY
Pope Edgecomb & Ferry,
ATTORNEYS.

UNITED STATES PATENT OFFICE.

PHILIP DIEHL, OF ELIZABETH, NEW JERSEY.

APPARATUS FOR HARDENING AND TEMPERING BY ELECTRICITY.

SPECIFICATION forming part of Letters Patent No. 388,645, dated August 28, 1888.

Application filed January 21, 1888. Serial No. 261,443. (No model.)

*To all whom it may concern:*

Be it known that I, PHILIP DIEHL, a citizen of the United States, residing in Elizabeth, in the county of Union, in the State of New Jersey, have invented certain new and useful Improvements in Apparatus for Hardening and Tempering by Electricity, of which the following is a specification.

The invention relates especially to an apparatus for hardening and tempering small metal objects—such, for instance, as needles.

The invention consists in heating a suitable tube, chute, or conveyer, through which the objects to be hardened may pass, to any required temperature by means of electric currents, and in causing the objects to move through the same while so heated with any required speed, so that they may be heated to the required temperature. As they are discharged from the tube or chute, they may be dropped into a vessel of oil or other suitable material.

In carrying out the invention it is convenient to employ a dynamo-electric generator or other suitable source of electric currents in connection with an inclined tube, duct, chute, or conveyer, which constitutes a portion of the electric circuit, and is therefore made of electrical conducting material. The current is of such character as to heat this chute to any required temperature. The points of electrical connection with the chute may be changed, if desired, so as to vary the length which is heated. The strength of the current may also be varied as required, thus varying the temperature to which the chute is raised. The conveyer may be inclined from a horizontal position, and suitable means may be provided for turning or vibrating this heating-chamber, so that the objects will readily pass through it. A suitable feeding device delivers the articles to the heating-chamber with such frequency as may be required.

The invention will be more fully described in connection with the accompanying drawings, illustrating various forms of devices for carrying it into operation.

Figure 1:
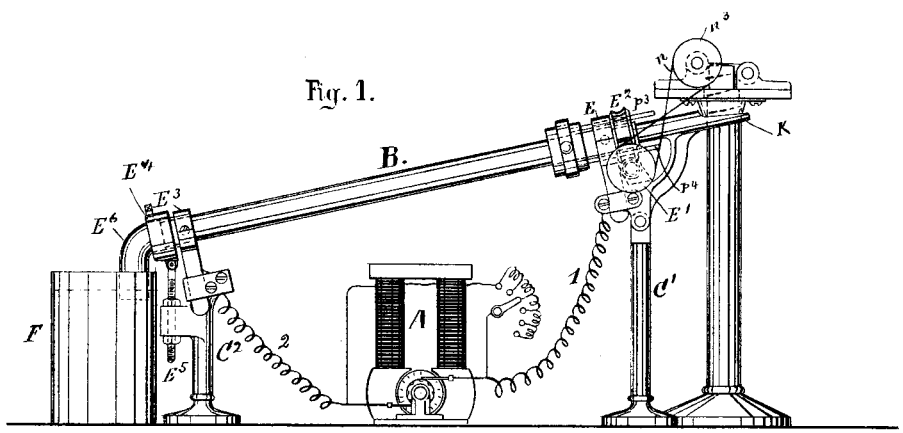
Figure 2:
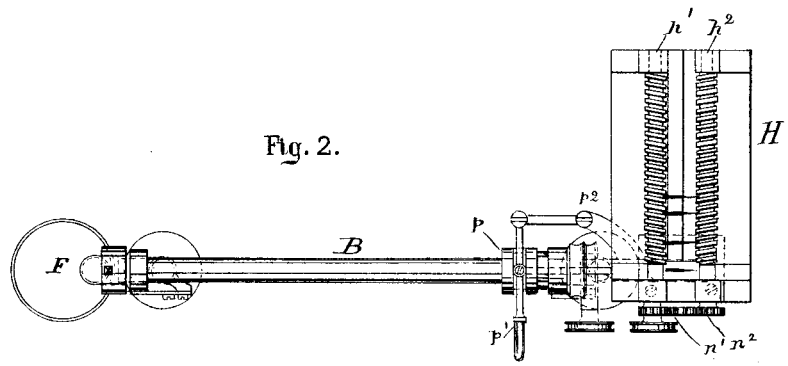

In the drawings, Figure 1 is a side elevation, and Fig. 2 a plan view, of a suitable apparatus. Figs. 3 and 4 are respectively a side elevation and a plan of a modified form. Fig. 5 is a detail of a form of feeder which may be employed. Fig. 6 is a detail of one of the binding-posts for securing electrical connection. Figs. 7 and 8 illustrate modified forms of heating chambers or chutes.

Referring to the figures, A represents a suitable source of electric currents, and B a tube or chute which is to be heated to any required temperature by currents from the source. The source of electric currents may be a generator of any suitable character—such, for instance, as a shunt-wound dynamo—and the currents therefrom may be regulated in any required well-known manner. One pole of the source of currents is connected by a conductor, 1, with the metal supporting one end of the conducting-chute B. The other end of this chute is connected by the conductor 2 with the other pole of the generator A. The chute B is inclined sufficiently to allow the needles or other articles to pass readily through it. One end of the chute is here shown as being supported upon a standard, C', which carries a wheel, E', geared with a wheel, $E^2$, upon the tube. The wheel E' is revolved in any convenient manner, and thus the chute B is revolved continuously. This causes the articles passing through the chute to pass down its length and to be constantly brought into contact with different portions of the heated surface. The lower end of the chute is carried in a collar, $E^3$, which in turn is supported from a pillar, $C^2$. The height of this end of the chute may be regulated by an adjustable collar, $E^4$, supported upon an adjustable screw, $E^5$, carried by the pillar $C^2$. The collar $E^4$ may also carry a tube, $E^6$, which extends into a vessel, F, for containing oil or other suitable substance, in which the articles are dropped as they pass from the chute B.

The needles or other articles are fed to the chute B by means of a feeder or conveyer, H, of any suitable form. That here shown consists of two threaded rods, $h'$ and $h^2$, which are revolved in opposite directions, and which are at such distance apart as to receive the respective ends of the articles, and thus convey them from one end to the other separately. At the end adjacent to the chute they are dropped into a receiving-tube, K, which delivers them to the chute B. The threaded rods $h'$ and $h^2$ may be turned in opposite directions by a belt, $n$, coupling the wheel E' with the belt-wheel $n^3$, which in turn communicates its motion to the gear-wheels $n'$ and $n^2$ upon the respective rods.

For the purpose of modifying the active length of the chute B, or the portion which is heated, a sliding collar, $p$, may be moved along its length by means of a lever, $p'$, which couples the collar in any suitable manner with a support, $p^2$, connected with the pillar C', and thus in electrical connection therewith. This collar may be connected by suitable pins, $p^3$ and $p^4$, with the supporting-collar E of the corresponding end of the chute B, so that it is prevented from turning.

In Figs. 3 and 4 a modification is illustrated, in which the tube B is vibrated instead of being revolved. This is accomplished by supporting the upper end of the chute above a revolving cogged wheel or cam, R, which is turned at any required speed in any convenient manner. The end of the tube resting upon this cam is moved up and down with any required rapidity, thus tending to cause the articles to move toward the lower end of the chute. In this instance electrical connections are made directly with collars $s'$ and $s^2$. The former is adjustable along the length of the chute, and thus the portion of the chute which is in the electric circuit may be varied.

In case the chute is vibrated either vertically or laterally, instead of being revolved, it may be of other form than tubular. Thus it may be U-shaped or V-shaped, as shown in Fig. 7, or in the form of a section of the tube, as shown in Fig. 8. It may be convenient in either of these instances to cover the open surface with transparent material, such as mica.

The operation of the apparatus will be evident without further explanation, and it is evident that various different forms of apparatus may be employed to carry the invention into effect. After the needles or other articles have been passed through the chute and heated to such temperature as may be required for hardening them, they may be passed through as many more times as may be required, and at such temperatures as may be necessary for tempering or "toning" them.

I claim as my invention—

1. An apparatus for hardening or tempering, consisting of the combination of a chute or conveyer, a feeder delivering the articles to be hardened or tempered thereto, a source of electric currents having its circuit through the chute or conveyer, whereby the latter is heated, an agitator or vibrator moving the conveyer and causing the articles to pass through the same, and a vessel for containing the cooling bath, into which the articles may be delivered from the chute.

2. In an apparatus for hardening or tempering, the combination, with a chute or conveyer through which the articles to be operated upon may be passed, of a source of electricity having its respective poles connected with different points in the length of said chute or conveyer.

3. In an apparatus for hardening or tempering needles and similar articles, the combination of a heating chute or conveyer, a source of electric currents having its circuit through said conveyer, and a vibrator applied to the chute, substantially as described.

4. In an apparatus for hardening or tempering needles and similar articles, the combination of an inclined heating chute or conveyer, and a source of electric currents having its circuit through said conveyer.

5. In an apparatus for hardening or tempering needles and similar articles, the combination of a heating chute or conveyer, a source of electric currents having its circuit through said conveyer, a vibrator applied to the chute, and a transparent cover for said chute or conveyer.

6. The combination, in a device or apparatus for hardening or tempering needles or similar articles, of a chute or conveyer through which the articles are to be passed, a source of electricity having one pole connected with the chute at a given point, and an adjustable contact device connected with the other pole of the source, through which connection may be made at different points along the length of the chute.

In testimony whereof I have hereunto subscribed my name this 13th day of January, A. D. 1888.

PHILIP DIEHL.

Witnesses:
JAMES G. GREENE,
L. B. MILLER.